United States Patent

[11] 3,571,504

[72] Inventors Yuji Kiuchi
Yokohama-shi;
Hiroo Hori, Kawasaki-shi; Mineo Iwasawa,
Kanagawa-ken; Junichi Hashimoto,
Yokohama-shi, Japan
[21] Appl. No. 776,445
[22] Filed Nov. 18, 1968
[45] Patented Mar. 16, 1971
[73] Assignee Tokyo Shibaura Electric Co., Ltd
Kawasaki-shi, Japan
[32] Priority Nov. 22, 1967, Jan. 6, 1968
[33] Japan
[31] 42/97825 and 43/541

[54] INFRARED RAY TELEVISION APPARATUS
3 Claims, 7 Drawing Figs.

[52] U.S. Cl. .......... 178/6.8, 178/6, 178/7.2, 313/65, 313/112
[51] Int. Cl. .......... H04n 7/18
[50] Field of Search .......... 178/6 (IR), 6 (TM), 6.5, 6.8, 7.2; 315/10 (Inquired); 313/65, 65 (A), 65 (T), 110, 112 (Inquired); 347/200 (Inquired)

[56] References Cited

UNITED STATES PATENTS

| | | | |
|---|---|---|---|
| 2,907,817 | 10/1959 | Teer | 178/5.4STC |
| 2,753,395 | 7/1956 | Lawrence | 178/6I |
| 2,770,746 | 11/1956 | Gray | 313/112 |
| 2,881,427 | 4/1959 | Huber | 343/200 |
| 3,352,965 | 11/1967 | Driver | 178/6.8 |
| 3,379,830 | 4/1968 | Menke | 178/6.8 |

FOREIGN PATENTS

| | | | |
|---|---|---|---|
| 226,430 | 5/1958 | Australia | 178/6.5 |
| 919,967 | 2/1963 | Great Britain | 313/65A |

*Primary Examiner*—Robert L. Griffin
*Assistant Examiner*—Joseph A. Orsino, Jr.
*Attorney*—George B. Oujevolk ABSTRACT: An infrared ray television apparatus wherein an incident light from a foreground subject is separated into an infrared ray and visible ray, these rays are converted to television signals by the respective image pickup means, and said signals corresponding to the infrared and visible rays are supplied to the input terminals of the red color electron gun and green color electron gun involved in a color television image-reproducing means thereby to reproduce on the same screen the infrared ray image and visible ray image in red and green colors respectively.

INVENTORS

BY

Attorney

Yuji Kikuchi
Hiroo Hori
Mineo Iwasawa
Junichi Hashimoto
INVENTORS

BY George B. Oujevolk
Attorney

INVENTORS

BY

Attorney

INFRARED RAY TELEVISION APPARATUS

The present invention relates to an infrared ray television apparatus, and more particularly to an infrared ray television apparatus capable of reproducing on the same screen an infrared ray image and visible ray image in prescribed different colors.

It is known that an infrared ray television apparatus enables an infrared image invisible to the naked eye to be reproduced as a visible one on a television image reproducing tube, thereby to detect that infrared ray source of a foreground subject which is not directly perceivable by the naked eye and watch or inspect such infrared ray source. The conventional infrared ray television apparatus picks up images using a single pickup tube usually sensitive to the infrared and visible zones. Accordingly, even where incident lights having different wavelengths are introduced from an infrared ray source and other backgrounds , the resultant signal outputs will be made substantially equal, if these incident lights have the same amount of energy, thus presenting difficulties in distinguishing between the infrared and visible rays and consequently making it impossible unfailingly to watch a source of infrared rays.

For resolution of these drawbacks, there has been practiced, for example, in watching a jetplane flying in the air, a process of fitting a television camera with a filter for eliminating visible rays thereby to remove unnecessary signals from the background, and taking out and reproducing only signals caused by infrared rays emitted from a heat element, namely, a jet engine so as more reliably to watch the jetplane. However, this method removed the neighboring backgrounds other than the infrared ray source out of sight due to the elimination of visible rays and failed to detect the position of the jetplane in the air relative to its surroundings.

Further, if a light entering the photoelectric plane of an image pickup tube is made to include a visible component so as to see the background of an infrared ray source, then there will naturally be reflected a visible ray also from the background of the infrared ray source, so that measurement of the intensity of radiation from the infrared ray source is accompanied with errors.

It is accordingly an object of the present invention to provide an infrared ray television apparatus capable of distinctly reproducing an image corresponding to the infrared ray source of a foreground subject against the background.

Another object of the invention is to reproduce an image corresponding to an infrared ray source distinctly in a specified color and indicate other images than that of the infrared ray source in a different color so as clearly to distinguish between these two types of images, thereby to make it easy to watch the relative position of the infrared ray source.

A further object of the invention is to provide an infrared ray television apparatus so arranged as to accurately detect on the reproduced screen the intensity of radiations from the infrared ray source.

In an aspect of the present invention, there is provided an infrared ray television apparatus comprising an image pickup means for obtaining video signals corresponding to the infrared and visible rays involved in an incident light from a foreground subject and a color television image reproducing means capable of reproducing images corresponding to said two types of video signals in different colors.

The present invention can be more fully understood from the following description when taken in conjunction with the accompanying drawings, in which.

Figure 1:
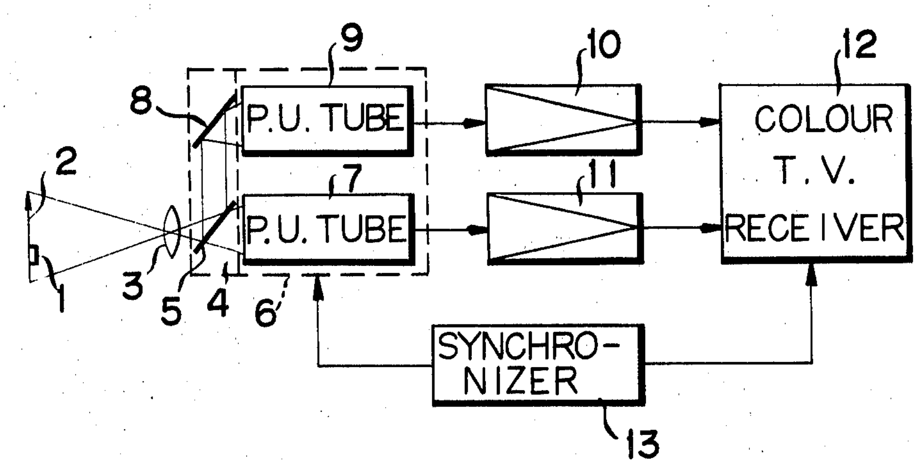
FIG. 1 is a schematic diagram of the arrangement of an infrared ray television apparatus according to an embodiment of the present invention.
Figure 2:
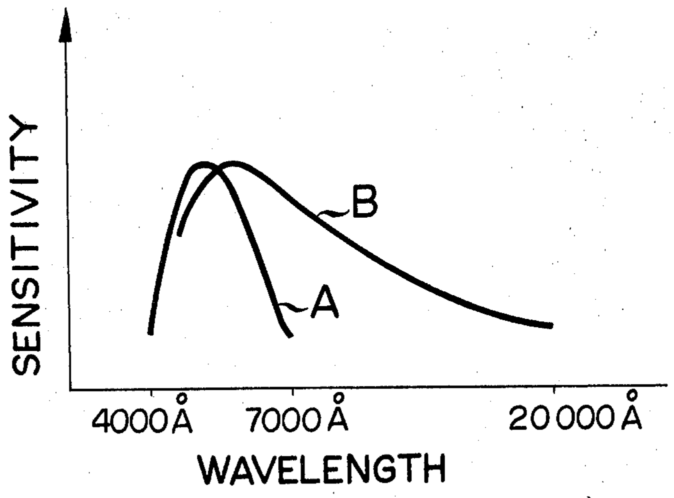
FIG. 2 is a curve diagram of the photoelectric sensitivity of a single pickup tube used in the aforementioned embodiment to the wavelengths of an incident light.

There will now be described an embodiment of the present invention by reference to FIGS. 1 and 2. An incident light from a foreground subject 2 including an infrared ray source to be picked up is introduced through a focusing lens 3 into the translucent mirror 5 of a wavelength-distinguishing optical system 4. This translucent mirror 5 is provided with a filter (not shown). The filter permits only an infrared ray component to permeate the translucent mirror 5 into the light-receiving plane of a first image pickup tube 7 of an image pickup means 6. On the other hand, only a visible component is reflected from the translucent mirror 5. After being reflected by the mirror 8 of the wavelength-distinguishing optical system 4, the visible ray is conducted to the light-receiving plane of a second image pickup tube 9. A translucent mirror provided with such a filter may preferably consist of a dichroic type. The image pickup tubes 7 and 9 are desired to be sensitive exclusively to the infrared and visible zones respectively. For general purposes, however, the image pickup tube 9 may be a type sensitive to the visible zone as shown by the curve A of FIG. 2 and the image pickup tube 7 may be a type sensitive to both visible zone as indicated by the curve B of said figure and infrared zone. The television signals corresponding to the infrared and visible rays obtained by the image pickup tubes 7 and 9 respectively are amplified by amplifiers 10 and 11 respectively, and supplied to the input terminals of the electron guns (not shown) of red and green colors respectively involved in a color television image reproducing means 12. Accordingly, it is possible to cause both the red color image of the infrared ray source 1 and the green color image of the foreground subject to be obtained on the screen at the same time. There is also provided a synchronizer 13 so as to allow the image pickup means 6 and color television reproducing means 12 to work synchronizingly.

The foregoing description relates to the case where the infrared ray image is indicated in a red color and the visible ray image in a green color. However, since the color television reproducing means can display a blue color in addition to the red and green colors, it is possible to present the aforementioned two types of images in a suitable combination of any two of these three colors.

Figure 3:
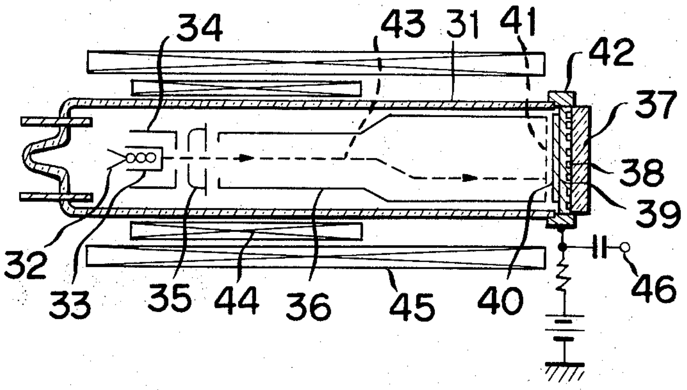
FIG. 3 is a schematic diagram of the arrangement of an infrared ray television apparatus according to another embodiment of the invention.
Figure 4:
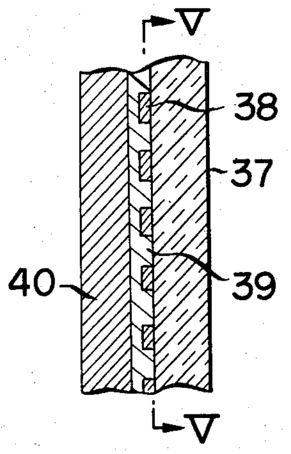
FIG. 4 is an enlarged section of a part of the photoconductive target involved in the apparatus of FIG. 3.

The aforementioned embodiment used one image pickup means for each of the infrared and visible rays. However, a single image pickup tube arranged as shown in FIG. 3 has the same effect. Referring to FIGS. 3 and 4, there are coaxially arranged a heater 32, cathode 33, first cylindrical grid electrode 34, second cylindrical grid electrode 35 and third cylindrical grid electrode 36 in the order mentioned from one end to the other of the interior of a vacuum vessel 31. To said other end of the vacuum vessel 31 is fitted a transparent glass substrate 37 constituting the face plate of the vessel 31. Spatially on the inner surface of the glass substrate is disposed a striped infrared ray filter 38. On the filter 38 are deposited a transparent conductive layer 39 and a photoconductive layer 40 composed of lead oxide and lead sulfide (PbO-PbS).

Figure 5:
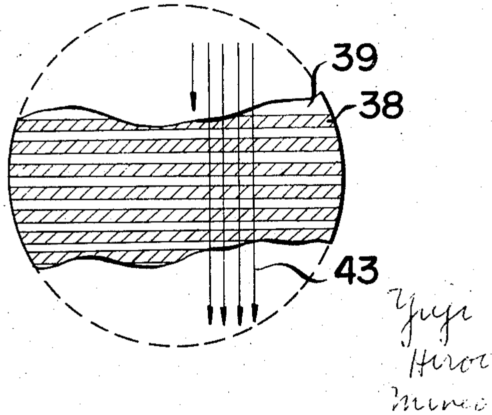
FIG. 5 is a section on line V –V of FIG. 4 as viewed in the direction of the arrows.

A target of the aforesaid arrangement may be prepared, for example, in the following manner. On one side of a transparent glass substrate 37 is a vacuum deposited by the known method using a mask a striped form of a substance such as germanium (Ge) or silicon (Si) which obstructs the visible ray, but is permeable to the infrared ray. On the infrared ray filter 38 thus prepared is vapor deposited a film of tin oxide commercially known as the NESA Film to form a transparent conductive layer 39. Further on the transparent conductive layer 39 is deposited by the known method a photoconductive layer 40 consisting of, for example lead oxide and lead sulfide (PbO-PbS) . At the furthest end of the third grid electrode 36 is provided a mesh electrode 41 substantially in parallel relationship to the opposite photoconductive layer 40. Around the transparent conductive layer 39 is positioned an annular electrode 42 electrically connected thereto. There is also provided a deflection coil 44 for scanning the electron beams 43 emitted from the cathode 33 perpendicularly to the lengthwise direction of the stripe filter 38 as shown in FIG. 5. Numeral 45 represents an electron beam focusing coil. The stripe filter 38 is desired to have the stripes whose respective width is, for example, 20 to 40 microns for a 1-inch vidicon and whose pitch ranges between about 20 and about 40 microns.

Figure 6:
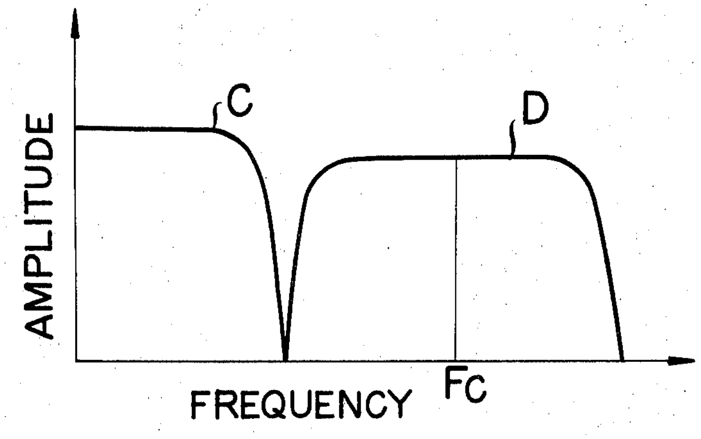
FIG. 6 is a diagram of the frequency spectra of video signals obtained by the image pickup means of FIG. 3.
Figure 7:
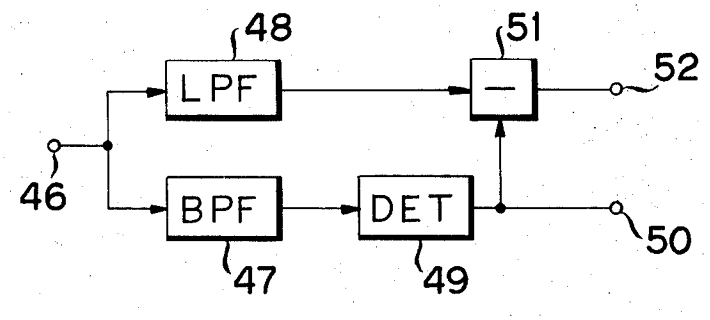
FIG. 7 is a circuit of a means for selectively extracting signals corresponding to the infrared and visible images from those obtained by the image pickup means of FIG. 3.

The stripe filter 38 is permeable to the infrared ray, but obstructs the visible rays, so that the signals obtained from the output terminal 46 by scanning the photoconductive layer 40 with electron beams consist of alternate repetitions of signals representing a combination of infrared and visible rays and those denoting the infrared ray along. If, therefore, the width and pitch of the stripes of the stripe filter 38 are so set that with the visible ray image, there can be obtained signals modulated by a prescribed frequency Fc as a result of electron scanning, then the video signals issued from the output terminal 46 will consist of a low frequency component corresponding to the infrared ray image shown by the curve C of FIG. 6 plus visible ray image and a high frequency component having a central frequency Fc corresponding to the visible ray image indicated by the curve D of said FIG. 6.

Where three is to be extracted from the video signals consisting of the aforementioned frequency components the desired signals corresponding only to the infrared ray component and those corresponding to the visible ray, it may be contemplated to use an apparatus involving a filter, for example, as shown in FIG. 7. According to such apparatus, the signals from the output terminal 46 are supplied to the band-pass filter 47 and low-pass filter 48 of the aforementioned central frequency Fc corresponding to the visible ray image. From the band-pass filter 47 are issued signals obtained by modulating a carrier wave having a frequency Fc as shown by the curve D of FIG. 6 with the signals corresponding to the visible ray image. When said first-mentioned signals are supplied to a detector 49 for demodulation, then there will be obtained from the terminal 50 an output signal corresponding to the infrared ray image. On the other hand, there are obtained from the low-pass filter 48 signals denoted by the curve C of FIG. 6. These signals include a component representing the visible rays in addition to the signals corresponding to the infrared ray image. To remove the visible component from the infrared component, outputs from the detector 49 are deducted by a deducting means 51. Thus at the output terminal 52 there are obtained output signals corresponding to the infrared ray image. The signals from the output terminals 50 and 52 are supplied to a color television receiver 12 in the same manner as in the embodiment of FIG. 1, obtaining the images of both infrared and visible rays at the same time.

As mentioned above, if there in, for example, an operating engine in a foreground subject, the present invention can make distinctly observable the position of a heat-generating section and the distribution of temperature in said engine. And if the foreground subject is exposed to visible rays including the infrared ray, the present invention enables materials reflecting the infrared ray at different rates to be indicated in separate colors, although said materials might otherwise appear to be of the same color to the naked eye.

We claim:

1. An infrared ray television apparatus including: an image pickup means for obtaining video signals corresponding to infrared and visible rays, the image pickup means consisting of an image pickup tube with a transparent glass substrate, a filter strip deposited thereon for allowing only the infrared ray to pass, a target composed of a transparent conductive layer, a photoconductive layer sensitive to the infrared and visible zones, all laminated on the filter strip in the order mentioned; a means for extracting out from the video signals issuing from the image pickup means two types of video signals respectively corresponding to the infrared and visible ray images; and a color television image reproducing means capable of reproducing images corresponding to said video signals.

2. An apparatus according to claim 1 wherein the color television reproducing means comprises a device for reproducing a red color image by video signals corresponding to the infrared ray image and another image of different colors by video signals corresponding to the visible ray image.

3. An apparatus according to claim 1 wherein the video signal extracting means comprises a low-pass filter and band-pass filter supplied with signals from the image pickup tube, a detector for demodulating signals from the band pass filter and a deducting means for deducting the detector outputs from the outputs of the low pass filter.